United States Patent Office 3,616,610
Patented Nov. 2, 1971

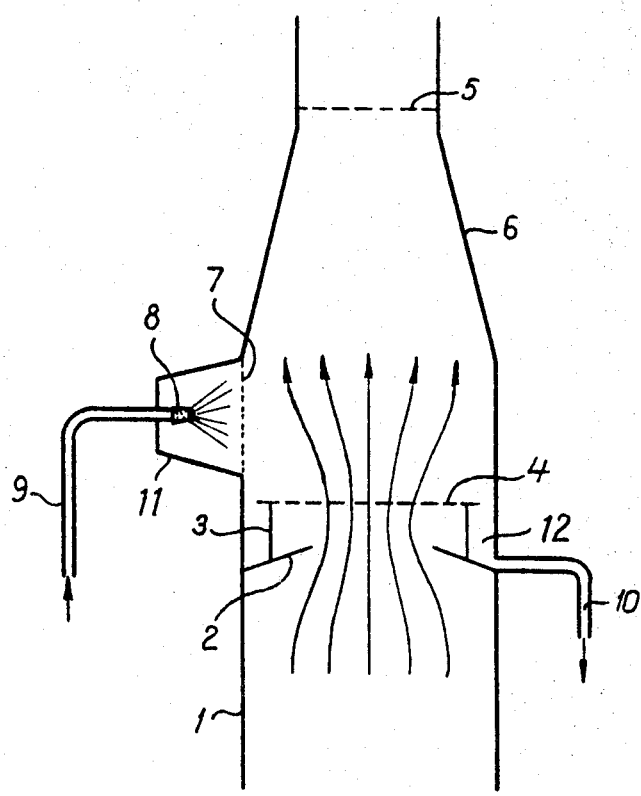

3,616,610
APPARATUS FOR SEPARATING DUST
FROM A GAS
Bronislav S. Javorsky, Huddinge, and Erik A. Gramer,
Spanga, Sweden, assignors to Alfa-Laval AB, Tumba,
Sweden
Filed Nov. 14, 1968, Ser. No. 775,663
Claims priority, application Sweden, Nov. 16, 1967,
15,724/67
Int. Cl. B01d 19/02, 47/04
U.S. Cl. 55—178
7 Claims

ABSTRACT OF THE DISCLOSURE

The dust-containing gas is caused to flow through a channel, and the latter is charged with a foam which is formed substantially independently of the kinetic energy of the flowing gas, the gas being forced to pass through and be filtered by the foam.

---

The present invention relates to apparatus for separating dust particles from a gas. The invention can be used either for purifying a gas or for recovering substances suspended in a gas. In the food-stuff industry, for example, the invention may be used for recovering from air or another gas, used in so called fluid-beds for drying a mashed product, particles of this product which have been conveyed from the fluid-beds by the gas and cannot be separated in a cyclone or any other normally used separator.

In separating dust particles from gas, an effective separation is desired with the smallest possible pressure drop of the flowing gas. This is very difficult, as the factors of highly effective separation and small pressure drop are inconsistent with each other. Thus, it is especially difficult to separate dust particles from gases which, for one reason or another, cannot be allowed to meet any substantial flow resistance in a separating apparatus. One difficult separating operation, for instance, is the freeing of chimney gases from soot particles and the like. For separating operations of this kind, there is presently no effective apparatus offering a sufficiently small pressure loss for the flowing gas. In such cases, attempts have been made to use previously known apparatus of a type in which the gas to be freed from dust particles is caused to flow from beneath through a foam-forming liquid, there being formed on the liquid surface a foam layer which acts like a filter for the throughflowing gas. Even such an apparatus, however, does not offer a sufficiently small through-flow resistance for the gas and cannot, therefore, be used for purifying chimney gases.

The present invention provides a new apparatus for separating dust particles from gases, such as chimney gases, which are not allowed to be subjected to a substantial pressure drop.

The apparatus according to the invention carries out the steps of causing the gas to flow through a channel, and charging this channel with a foam which is formed substantially independently of the kinetic energy of the flowing gas, the gas being forced to pass through and be filtered by the foam. In this way, it is possible to free a gas from dust particles practically without any pressure loss at all for the gas.

As used herein, the term "foam" means a colloid system in which a gas is dispersed in a liquid.

Preferably, a part of the foam in the channel is broken down, for example, mechanically; and the resulting liquid, which contains dust particles, is removed from the foam. Then the part of the foam which has been broken down is replaced by new foam, so that the separating operation may go on continuously. It is also possible, however, to forego breaking down the foam positively but allow the foam to become saturated with dust particles and break down by itself. New foam may be supplied continuously, or discontinuously at predetermined time intervals.

The new apparatus has many advantages, among which are the following:

(1) The foam supplied to the channel offers an extremely low flow resistance to the gas flowing through it, and it effectively blockades the path for the dust particles contained by the gas. It is thus possible to achieve an effective separation with a gas pressure drop of only a few millimeters of water column.

(2) As a foam has several times larger volume than the liquid from which it is formed, the amount of liquid coming from foam which has been broken down will be very small, which facilitates the removal and/or recovering of dust particles separated out.

(3) From point (2) above, it will be obvious that the amount of liquid which must be supplied for compensating for the broken down foam will be very small, too.

(4) The new apparatus may be very easily installed in existing plants, and it results in no substantial change in the pressure of the flowing gas to be freed from dust particles. Thus, there is no need for exchanging fans or building higher chimneys.

(5) By the new apparatus, it is possible even to purify gases coming from very small combustion units, without auxiliary fans.

(6) The apparatus according to the invention may be used also when the gas to be freed from dust particles flows through a horizontal channel. In the prior apparatus previously described, the gas must pass through a horizontal foam-forming liquid layer, and this sometimes may complicate the arrangement of such apparatus.

According to the invention, the gas after having been freed from dust particles may be passed through blocking means, such as a perforated plate, adapted to prevent foam from being conveyed by the gas out of the channel. The foam supplied to the channel may be kept in motion by means of a mechanical agitator, or by vibration, so that incoming foam will be rapidly distributed all over the cross-sectional area of the channel. Mechanical agitation may be used also for breaking down foam already consumed for separating out dust particles. An extremely good separation has been achieved in a channel which tapers in the flow direction of the gas.

A foam suitable for use in the present invention may be formed by dispersing air in liquid in such a proportion that the liquid content will be 2–10%, by volume, of all the foam.

A preferred embodiment of an apparatus of the invention is described below with reference to the accompanying drawing, in which the single illustration is a schematic view of an apparatus for freeing chimney gases from soot particles and the like.

The apparatus comprises a tube 1 which is intended to be so placed that it constitutes an extension of a chimney and will be passed through by chimney gas from below and upwards, as illustrated by arrows in the drawing. The tube 1 is provided on its inside wall with an inwardly and upwardly directed annular flange 2 whereon there is arranged a sleeve 3 extending coaxially with the tube 1. On the top of the sleeve 3 there is placed a net or perforated screen 4, and slightly higher in the tube 1 there is arranged another net or perforated screen 5. Between the two screens 4 and 5, the tube 1 forms a treatment zone or chamber and has a section 6 with upwardly decreasing cross-sectional area.

Just above the lower screen 4, means are provided for charging the tube 1 with foam. Such means comprise a fine-meshed net 7 covering an opening in the tube wall, and a nozzle 8 arranged outside the tube. Air and a foam-forming liquid are supplied to the nozzle 8 under pressure, through a conduit 9, and sprayed onto the net 7. The conduit 9 thus constitutes a source of a liquid and a gas other than the chimney gas from which the particles are to be separated. On the inside of the net 7, a foam is formed which gradually spreads out in the tube 1 and fills it entirely between the two horizontally arranged screens 4 and 5. As shown, the nozzle 8 is contained in a casing 11 affixed to the tube 1.

The chimney gas flowing through the tube 1 is thus forced to pass through the foam in the section 6, whereby soot particles and the like carried by the gas are filtered out by the foam. The flange 2 effectively prevents the gas from flowing up all along the tube walls and failing to be filtered through the foam. When the foam is saturated with soot particles, it is broken down by itself and returned to liquid form. Liquid, containing soot, then will flow downward along the walls of the tube 1 and be collected in a groove 12 formed by the flange 2 and the tube wall just beneath the lower screen 4. From this groove, the liquid is discharged continuously from the tube through a conduit 10. The form of the tube section 6 guarantees a uniform density of the foam between the two screens 4 and 5, as its upwardly decreasing cross-sectional area compensates for the breaking down of foam, increasing in the flow direction of the gas. The screen 5 forms a blocking zone for preventing foam from being conveyed by the gas from the tube section 6.

The foam-forming liquid introduced through conduit 9 may be any of the well-known liquids adapted to form a foam of the character described.

We claim:

1. Apparatus for separating particles from a first gas, which comprises means forming a treatment chamber for throughflow of said first gas, the chamber having a foam inlet, foam forming means including a source of a liquid and a gas other than said first gas, said foam forming means being positioned to charge said chamber through said foam inlet to form a foam layer in the chamber, means for supporting said foam layer in the chamber, and means for directing said first gas into the foam layer at a distance from said foam inlet, said foam supporting means being a perforated member positioned in the path of said first gas flowing through the chamber.

2. The apparatus of claim 1, in which the cross-sectional area of said chamber decreases in the flow direction of the first gas.

3. The apparatus of claim 1, in which said foam-forming and charging means include a fine-meshed element adjoining the chamber, and a nozzle located outside the channel for spraying said other gas and foam-forming liquid against said element.

4. The apparatus of claim 1, in which said chamber is formed by a vertically disposed tube.

5. The apparatus of claim 4, comprising also an upwardly and inwardly directed annular flange in the tube, said flange at least partly defining a groove extending around the inside of the tube for collecting liquid draining from said foam.

6. The apparatus of claim 5, in which said flange is arranged to direct the first gas along the central portion of the tube just below said perforated member.

7. The apparatus of claim 1, in which said perforated member is positioned so that said first gas flows through said member before penetrating into said foam layer.

References Cited

UNITED STATES PATENTS 3,306,008  2/1967  Silverman _____ 55—87

FOREIGN PATENTS 14,806  10/1915  Great Britain.
405,387  2/1934  Great Britain.

REUBEN FRIEDMAN, Primary Examiner

R. W. BURKS, Assistant Examiner

U.S. Cl. X.R.

55—260; 261—115